United States Patent Office 3,663,571
Patented May 16, 1972

3,663,571
LACTONE COMPOUND AND PROCESS FOR PREPARATION THEREOF
Shiro Kimura, Teruo Kobayashi, and Sadao Ishige, Kanagawa, and Masatak Kiritani, Shizuoka, Japan, assignors to Fuji Photo Film Co., Ltd., Kanagawa, Japan
No Drawing. Filed June 24, 1970, Ser. No. 49,510
Claims priority, application Japan, June 27, 1969, 44/50,820
Int. Cl. C07d 5/46
U.S. Cl. 260—343.3                                    5 Claims

ABSTRACT OF THE DISCLOSURE

A novel lactone having the general Formula I

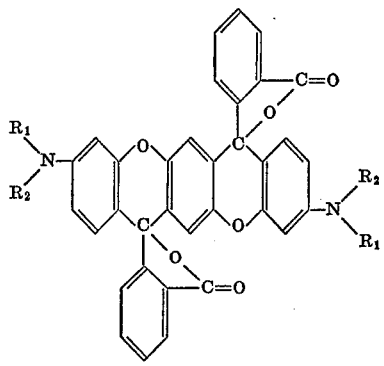

wherein $R_1$ and $R_2$ each is an alkyl group having from 1 to 5 carbon atoms or a benzyl group and a process for its preparation is disclosed. The lactone is useful in copying papers.

FIELD OF THE INVENTION

The present invention relates to a novel lactone compound and a process for its preparation.

SUMMARY OF THE INVENTION

The novel lactone of this invention has the following general Formula I

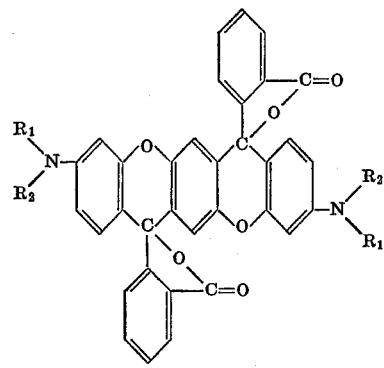

Formula I wherein $R_1$ and $R_2$ each is an alkyl group having from 1 to 5 carbon atoms or a benzyl group.

Although the lactone compound represented by the above Formula I and obtained by the process of the invention is, in itself, substantially colorless, it instantly produces a dark green, a dark blue, or a black color when contacted with an electron accepting substance, such as a solid acid, for example, acid clay, active clay, bentonite, zeolite, attapulgite or magnesium trisilicate, or an organic acid, for example, benzoic acid, benzene sulfonic acid or naphthol.

The compound of the invention is very useful as a color former for use in a pressure-sensitive copying paper, a heat-sensitive copying paper or a photosensitive copying paper.

The process for the preparation of the above compound comprises reacting an o-(4-dialkylamino-2-hydroxy-benzoyl) benzoic acid, represented by the general Formula II, with hydroquinone in the presence of a condensing agent,

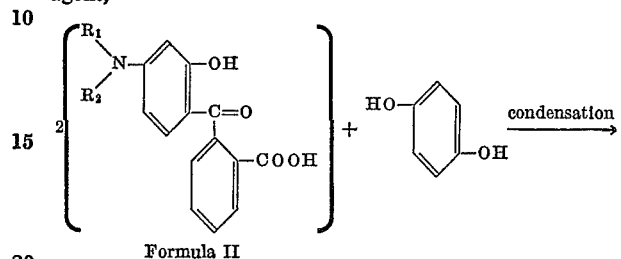

Formula II

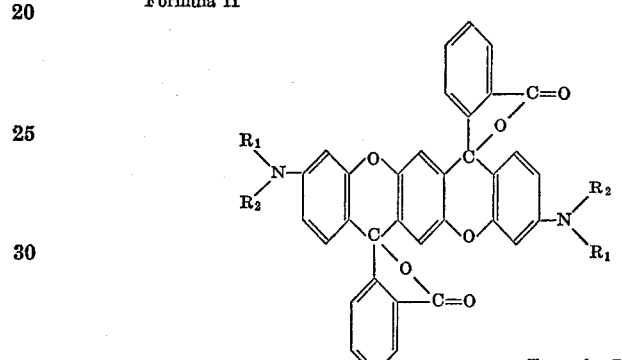

Formula I wherein $R_1$ and $R_2$ are as above defined.

The reaction temperature is determined by the type of condensing agent, and, if the system contains water, the temperature is mutually related to the concentration of the condensing agent. Suitable examples of the condensing agents, concentrations and reaction temperatures are sulfuric acid (concentration: from 50 to 100%, reaction temperature: from 60 to 160° C.), fuming sulfuric acid (less than 20%, from 20 to 100° C.), phosphorus pentoxide (from 80 to 120° C.), polyphosphoric acid (from 100 to 140° C.), phosphorus oxychloride (from 80 to 100° C.) and anhydrous zinc chloride (from 120 to 180° C.). With the above condensing agents, phosphorus pentoxide, polyphosphoric acid, anhydrous zinc chloride and phosphorus oxychloride are dissolved in chloroform, benzene and the like, so the concentration used is not limited.

The completion of the reaction can be determined by measuring the color density of the product, which is an acid dye. The reaction is generally completed in about 3 hours in the case of using 98% sulfuric acid at 100° C.

The thus obtained product is then neutralized with an alkali, extracted and recrystallized using conventional techniques.

Typical examples of the compounds represented by the Formula II are o-(4-dimethylamino-2-hydroxybenzoyl)benzoic acid,
o-(4-diethylamino-2-hydroxybenzoyl) benzoic acid,
o-(4-N-ethyl-N-n-butylamino-2-hydroxybenzoyl) benzoic acid,
o-(4-N-benzyl-N-ethylamino2-hydroxybenzoyl) benzoic acid, and the like.

One or two of the hydroxyl groups of Formula II may be esterified or etherified. Further, the hydroxyl group or groups may be condensed with aniline compounds to form a condensed compound in the form of an anilinophenol.

EXAMPLE 1

In 90 cc. of a 98% sulfuric acid, 0.1 mole of ortho-(4-diethylamino - 2 - hydroxybenzoyl) benzoic acid and 0.05 mole of hydroquinone were dissolved and the solution was heated at 80 to 100° C. for 3 hours. The reaction mixture was then poured into ice water, and the precipitate was neutralized with an aqueous caustic soda, extracted with chloroform and dried. The crystals thus recovered were recrystallized from a benzene-chloroform mixture to obtain a substantially colorless lactone compound of the following formula in a yield of 40%.

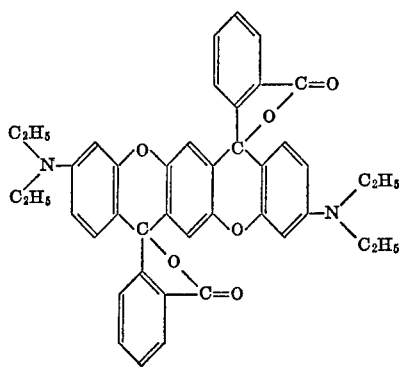

The compound became dark purple when heated to about 350° C. and fused and decomposed at 355–357° C. A dark purple developed with the compound in a 95% acetic acid and the absorption maxima thereof were: $\lambda_1=660$ m$\mu$, $\lambda_2=604$ m$\mu$, $\lambda_3=556$ m$\mu$, $\lambda_4=518$ m$\mu$, $\lambda_5=425$ m$\mu$ and $\lambda_6=460$ m$\mu$. In its infrared absorption spectrum, there was an absorption attributable to the C=O of the lactone at 1760 cm.$^{-1}$, an absorption of about 1680 cm.$^{-1}$ and of about 2600 cm$^{-1}$ attributable to COOH in the starting material, the compound of the general Formula II, disappeared. The results of elementary analysis and of mass spectrography coincided with that of the above formula.

EXAMPLE 2

In 90 cc. of a 98% sulfuric acid, 0.1 mole of ortho-(4-diethylamino - 2 - hydroxybenzoyl) benzoic acid and 0.05 mole of hydroquinone were dissolved and treated in a similar manner as used in Example 1 to obtain a lactone compound represented by the following formula.

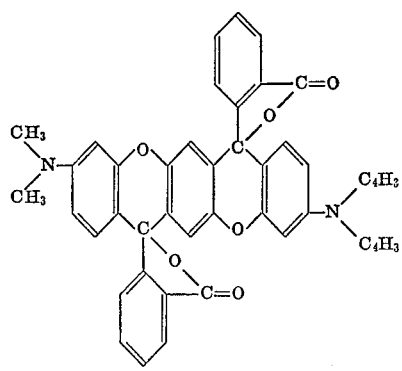

The compound had a melting point about 370° C. and was dark purple in a 95% acetic acid of which the absorption maxima were: $\lambda_1=655$ m$\mu$, $\lambda_2=599$ m$\mu$, $\lambda_3=553$ m$\mu$, $\lambda_4=519$ m$\mu$, $\lambda_5=424$ m$\mu$ and $\lambda_6=460$ m$\mu$. The infrared absorption spectrum exhibited an absorption at 1760 cm.$^{-1}$ attributable to the C=O of lactone. The results of the elementary analysis and mass spectrography coincided with that of the above formula.

EXAMPLE 3

In 60 cc. of a 95% sulfuric acid, 0.1 mole of ortho-(4-N-ethyl-N-n-butylamino - 2 - hydroxybenzoyl) benzoic acid and 0.05 mole of hydroquinone were dissolved and heated at 90–100° C. for 8 hours. The reaction mixture was then treated in a manner similar to that used in Example 1 to obtain a lactone compound represented by the following formula.

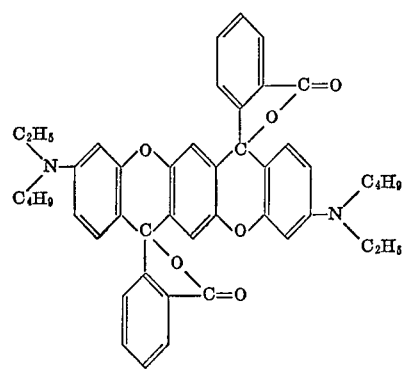

The compound discolored to a purplish black at about 310° C. and fused and decomposed. The compound was dark purple in a 95% acetic acid of which the absorption maxima were $\lambda_1=662$ m$\mu$, $\lambda_2=605$ m$\mu$, $\lambda_3=557$ m$\mu$, $\lambda_4=518$ m$\mu$, $\lambda_5=425$ m$\mu$, and $\lambda_6=460$ m$\mu$. The infrared absorption spectrum of the compound showed an absorption at 1760 cm.$^{-1}$ attributable to the C=O of lactone. The results of the elementary analysis and mass spectrography coincided with that of the above formula.

What is claimed is:
1. A compound having the general formula

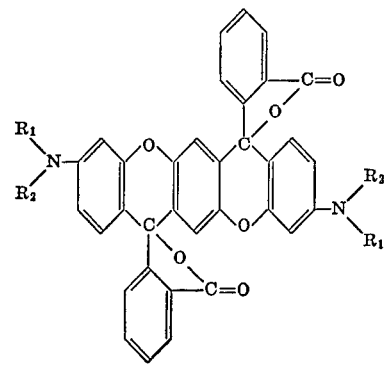

wherein $R_1$ and $R_2$ each is a member selected from the group consisting of an alkyl group having from 1 to 5 carbon atoms and a benzyl group.

2. A compound selected from the group consisting of o-(4-dimethylamino - 2 - hydroxybenzoyl) benzoic acid, o-(4-diethylamino-2-hydroxybenzoyl) benzoic acid, o-(4-N-ethyl-N-n-butylamino-2-hydroxybenzoyl) benzoic acid and o-(4-N-benzyl-N-ethylamino-2-hydroxybenzoyl) benzoic acid.

3. A process for the preparation of a lactone compound having the general Formula I,

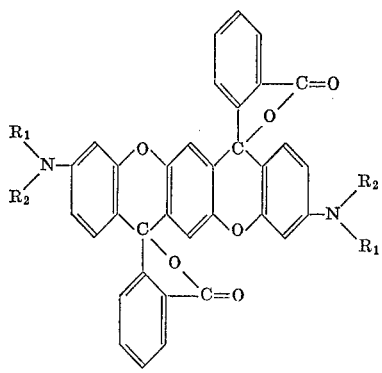

wherein $R_1$ and $R_2$ each is a member selected from the group consisting of an alkyl group having from 1 to 5 carbon atoms and a benzyl group which comprises condensing 2 moles of o-(4-dialkylamino-2-hydroxybenzoyl) benzoic acid having the general Formula II

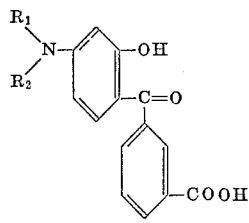

with hydroquinone in the presence of a condensing agent selected from the group consisting of sulfuric acid, fuming sulfuric acid, phosphorus pentoxide, polyphosphoric acid, anhydrous zinc chloride and phosphorus oxychloride.

4. The process as claimed in claim 3, wherein said compound represented by Formula II is a member selected from the group consisting of o-(4-dimethylamino-2-hydroxybenzoyl) benzoic acid, o-(4-diethylamino-2-hydroxybenzoyl) benzoic acid, o-(4-N-ethyl-N-butylamino-2-hydroxybenzoyl) benzoic acid and o-(4-N-benzyl-N-ethylamino-2-hydroxybenzoyl) benzoic acid.

5. A process for the preparation of a lactone compound having the Formula I,

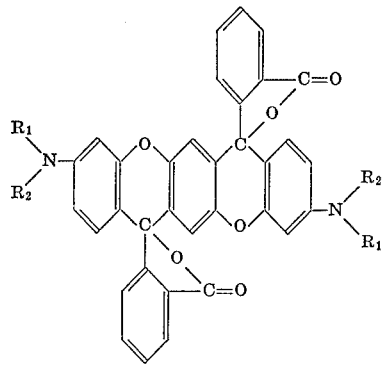

wherein $R_1$ and $R_2$ each is a member selected from the group consisting of an alkyl group having from 1 to 5 carbon atoms and a benzyl group, which comprises condensing 2 moles of o-(4-dialkylamino-2-hydroxybenzoyl) benzoic acid having the following general Formula II,

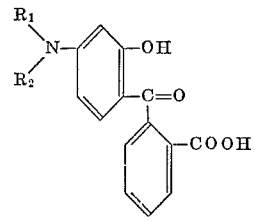

with hydroquinone at a temperature of from 60 to 160° C. in the presence of sulfuric acid, said sulfuric acid having a concentration of from 50–100%.

References Cited
UNITED STATES PATENTS
3,501,331   3/1970   Kimura et al. _____ 260—343.3

ALEX MAZEL, Primary Examiner

A. M. T. TIGHE, Assistant Examiner

U.S. Cl. X.R.
117—36.8; 282—28